United States Patent [19]
Schilling et al.

[11] Patent Number: 5,776,567
[45] Date of Patent: Jul. 7, 1998

[54] MULTI-LAYER FILTER FOR SEPARATING SOLID AND LIQUID WASTE

[75] Inventors: Michael Ray Schilling, Clinton; Morris Fred Mintz, Monroe, both of La.

[73] Assignee: Pactec, Inc., Clinton, La.

[21] Appl. No.: 755,124

[22] Filed: Nov. 22, 1996

Related U.S. Application Data

[63] Continuation of Ser. No. 144,796, Oct. 28, 1993, abandoned.

[51] Int. Cl.⁶ ............................................. B01D 39/00
[52] U.S. Cl. ..................... 428/34.5; 428/36.1; 428/362; 428/39.9; 428/39.91; 428/109; 428/110; 428/240; 428/247; 428/251; 428/255; 428/284; 428/285; 428/286; 210/241; 210/473; 210/474; 210/483; 210/500.21; 210/500.27; 210/503; 210/504
[58] Field of Search .................. 428/109, 110, 428/111, 240, 247, 255, 251, 284, 285, 286, 34.1, 36.2, 36.4, 36.9, 36.91, 36.1, 34.5; 210/500.1, 500.21, 500.27, 503, 241, 473, 474, 500, 526, 483, 504

[56] References Cited

U.S. PATENT DOCUMENTS

| | | | |
|---|---|---|---|
| 3,713,931 | 1/1973 | Lerche-Svendser | 428/109 |
| 4,192,746 | 3/1980 | Arvanitakis | 210/73 |
| 4,302,495 | 11/1981 | Marra | 428/110 |
| 4,427,551 | 1/1984 | Duveau | 210/741 |
| 4,448,690 | 5/1984 | Maphis | 210/609 |
| 4,569,874 | 2/1986 | Kuznetz | 428/109 |
| 4,585,557 | 4/1986 | Turnquist | 210/320 |
| 4,867,877 | 9/1989 | Hansen et al. | 210/257.1 |
| 4,871,454 | 10/1989 | Lott | 210/205 |
| 4,929,353 | 5/1990 | Harris | 210/237 |
| 4,944,873 | 7/1990 | Williams | 210/209 |
| 4,948,651 | 8/1990 | DeBusk et al. | 428/109 |
| 5,156,749 | 10/1992 | Williams | 210/770 |
| 5,178,752 | 1/1993 | McKinnon | 210/121 |
| 5,227,060 | 7/1993 | Roy et al. | 210/258 |
| 5,354,604 | 10/1994 | Blakeman et al. | 428/247 |

*Primary Examiner*—Rena L Dye
*Attorney, Agent, or Firm*—Arnold, White & Durkee

[57] ABSTRACT

A flexible, multi-layer filter for separating solid and liquid wastes. In a preferred embodiment, the filter includes first, second, third, and fourth layers, interconnected by appropriately spaced connectors. The first layer comprises sub-layers of parallel strands, wherein the strands in one sub-layer cross and overlap the strands in the other sub-layer to form a netting. The second layer comprises a fibrous mat, and the third layer comprises a netting like that of the first layer. The fourth layer includes a porous filter cloth. The third layer may be cut to form end and side tabs for retaining the filter inside a conventional waste container. After a semi-solid mixture of waste is poured, dumped, or otherwise placed into the waste container, liquid waste passes through the filter layers under the force of gravity. The liquid waste is channelled through the first layer along the bottom of the waste container. The liquid waste may be discharged from the container by opening a drain, or by slightly-opening a gate in the waste container. The invention is especially effective for extracting liquid waste from semi-solid materials, such as catalysts produced in petroleum refining, industrial process sludges, slurries, sewage matter, and materials collected in storm drains such as grit, rocks, leaves, silt, and dirt.

54 Claims, 3 Drawing Sheets

5,776,567

MULTI-LAYER FILTER FOR SEPARATING SOLID AND LIQUID WASTE

This application is a continuation of application Ser. No. 08/144,796, filed Oct. 28, 1993 which is now abandoned.

BACKGROUND OF INVENTION

1. Field of Invention

This invention generally relates to a system for separating solid and liquid wastes. More particularly, the invention concerns a flexible filter for use as a liner in a waste container, to extract liquid wastes from semi-solid wastes such as sludges or slurries, and to encapsulate the solid wastes for convenient disposal, chemical treatment, or storage.

2. Description of Related Art

As more and more public attention is focused on the disposal of waste, more and more pressure is felt by the waste disposal industry to develop efficient techniques for waste disposal. Although many existing techniques are quite effective, they tend to involve substantial expense. Furthermore, these expenses are often a direct function of the volume of waste to be disposed. As a result, it is important to minimize the volume of waste prior to disposal. One method for reducing the volume of waste is to separate the solid and liquid components, and then treat the components separately. In some cases, the separated liquid components may be recycled more easily or inexpensively with conventional waste treatment techniques. The separated solid waste may be treated if possible, or deposited in an appropriate waste disposal site.

Another reason for separating solid and liquid wastes relates to the disposal procedures followed at many landfill sites. In particular, landfills require elimination of all free flowing liquids prior to disposal of waste. To comply with this requirement, some parties pre-separate solid and liquid waste components, and other parties use various solidifying agents. Solidifying agents, however, are usually costly; and they necessarily increase the volume of waste, further raising disposal costs. Hence, separating solid and liquid wastes is of paramount importance today.

A number of approaches have been developed to accomplish solid-liquid waste separation. For example, some approaches use industrial equipment such as centrifuges, filter presses, and dryers. Although these approaches may be helpful in some instances, they are less than adequate in other applications. In particular, these approaches can be quite expensive and less effective than might be required.

BRIEF SUMMARY OF INVENTION

In a general aspect, the present invention is concerned with a system for separating solid and liquid wastes. More specifically, the invention resides in the use of a flexible multi-layer filter to remove liquids from solid waste. In a preferred embodiment, the filter is used as a liner for waste containers. Under the force of gravity, liquid waste passes through the liner, which channels the liquid along the bottom of the waste container to a drain or other opening provided in the container. The liner collects the remaining solids for easy removal from the waste container, and subsequent treatment, storage, or disposal.

In a preferred embodiment, the filter of the invention includes a porous filter cloth, which is placed inside a waste container such as a "roll-off" container. Beneath the filter cloth resides a layer of netting that includes two sub-layers of parallel strands, where the strands in one sub-layer overlap and cross the strands in the other sub-layer. These crossing strands form interstices that receive liquid that drains through the filter cloth under the force of gravity. A fibrous mat resides beneath the netting to prevent the filter cloth, under pressure created by the weight of the waste above, from poking downward through the interstices in the netting and possibly blocking the downward flow of liquid through the netting. A second layer of netting is provided beneath the fibrous mat, to effectively channel the drained liquid along the bottom of the waste container to a drain or other opening in the container.

BRIEF DESCRIPTION OF DRAWINGS

The nature, objects, and advantages of the invention will become more apparent to those skilled in the art after considering the following detailed description in connection with the accompanying drawings, in which like reference numerals designate like parts throughout, wherein.

DESCRIPTION OF A PREFERRED EMBODIMENT

Structure

Figure 1:
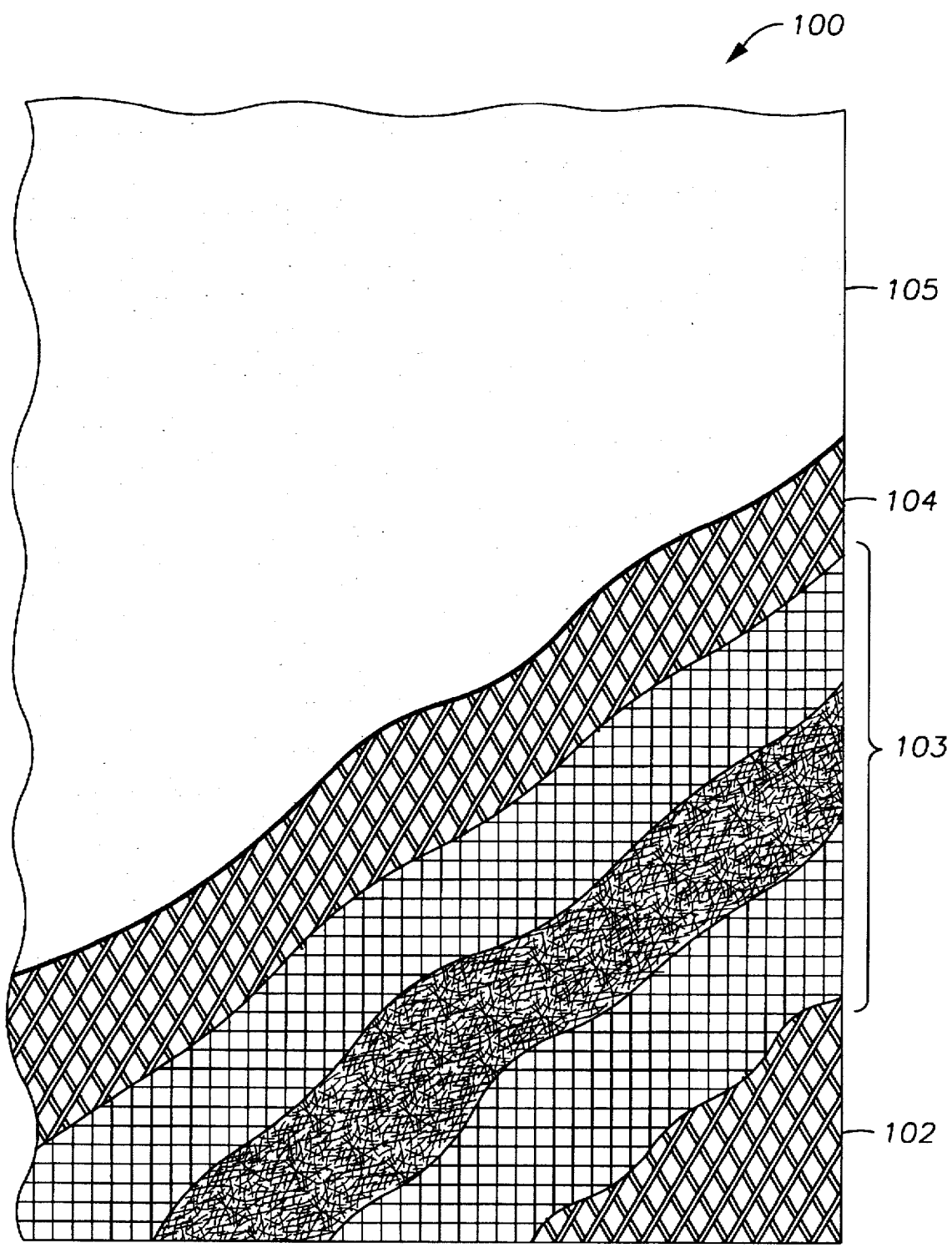
FIG. 1 is a partially cut-away plan view of a multi-layer filter 100 in accordance with the invention.

The invention comprises a filter 100 including multiple layers (FIG. 1). In a preferred embodiment, the invention includes four layers—a first layer 102, a second layer 103, a third layer 104, and a fourth layer 105.

The layers are preferably interconnected and held together by connectors (not shown), which are spaced appropriately to restrict motion of the different layers 102–105 with respect to each other. Each connector preferably comprises a unitary, plastic wire/cable bundling tie that takes the form of an elongated, toothed strap having a narrow tongue on one end and a complimentarily toothed socket at the opposite end; the strap is retained in a looped, interlocking condition by inserting the tongue into the socket. Although plastic wire/cable bundling ties are preferred, connectors such as wire loops, plastic fasteners, heat seals, staples, metal clips, or other suitable connecting agents may be utilized.

Figure 2:
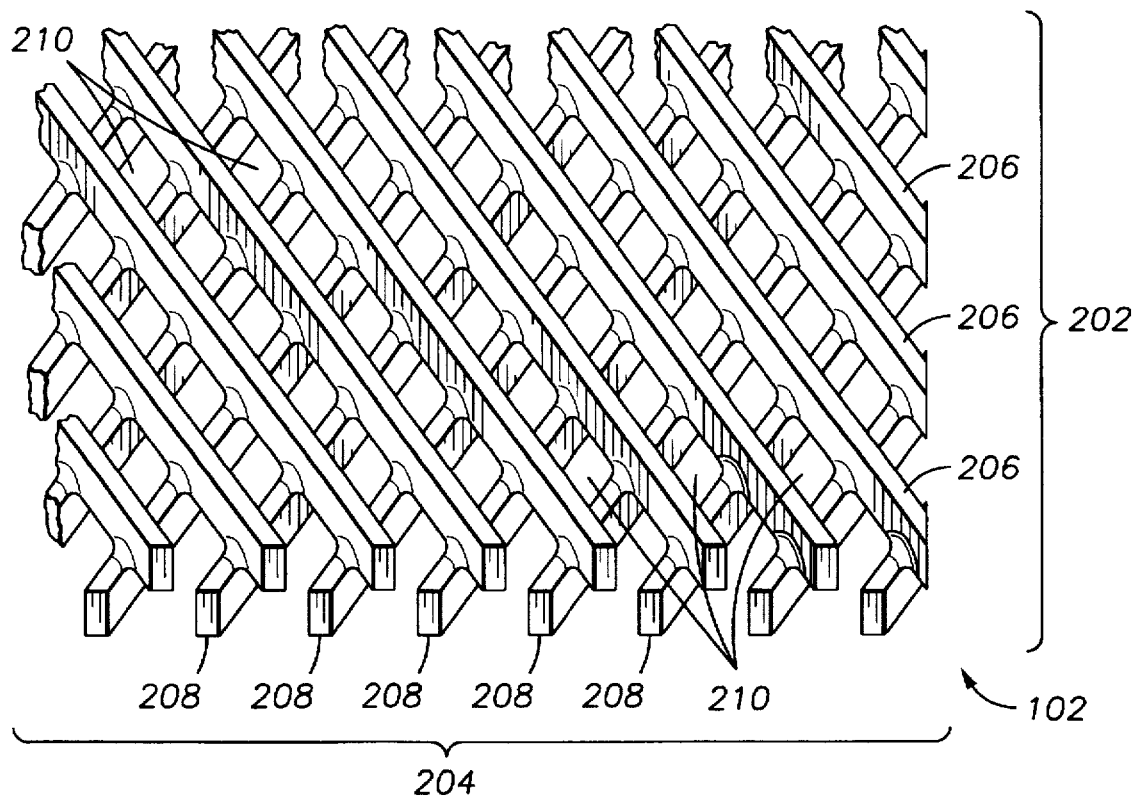
FIG. 2 is an enlarged isometric view of a first layer 102 of the filter 100, in accordance with the invention.
Figure 3:
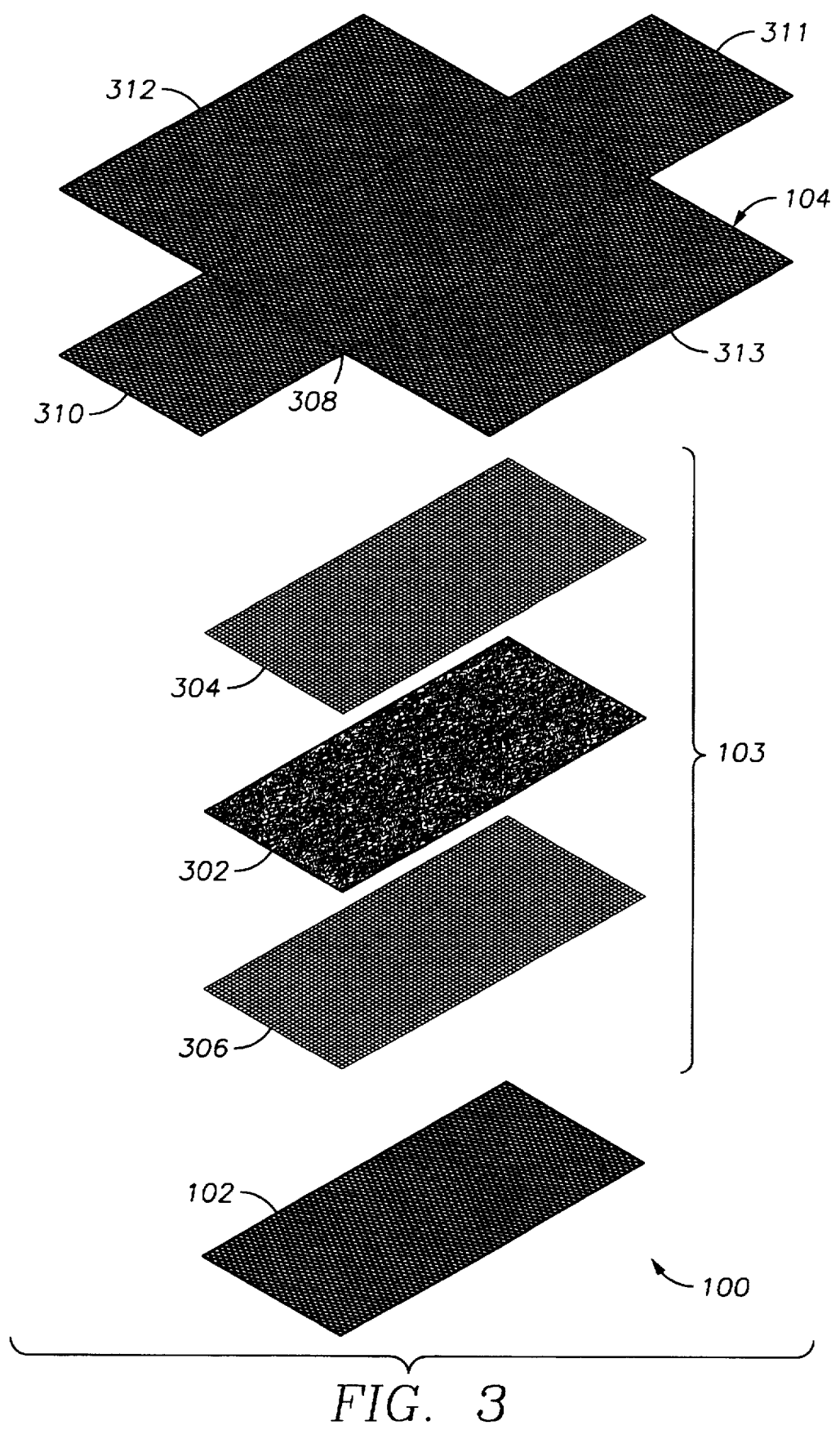
FIG. 3 is an isometric exploded view of an exemplary embodiment of the filter 100, in accordance with the invention.

The first layer 102 is shown in greater detail in FIGS. 2 and 3. The first layer 102 comprises netting that includes two sub-layers 202, 204 of parallel strands 206, 208, wherein the strands in one sub-layer cross and overlap the strands in the other sub-layer, forming interstices 210 therebetween. Preferably, the first layer 102 comprises a polymeric netting material such as the GUNDNET™ product manufactured by Gundle Lining Systems, Inc. (Houston, Tex.), or the Flex-Net product manufactured by Poly-Flex, Inc. (Grand Prairie, Tex.). Preferably, the thickness of the first layer 102 is about 0.2 to 0.265 inch, and the spacing between adjacent strands is about 0.25 inch. However, the thickness and spacing of the first layer 102 may be adjusted in accordance with the viscosity of the liquid waste desired to be removed from solid or semi-solid waste. High density polyethylene or polypropylene material is advantageous since it is durable, flexible, rust-proof, water insoluble, lightweight, and inexpensive. However, other flexible materials may be substituted.

The second layer 103 (FIGS. 1, 3) comprises a fibrous mat, which preferably takes the form of a polyester material (not shown) such as Fiberfill high loft webbing of Carlee Corp. (Rockleigh, N.J.), with a thickness of between about 3.33 to 6.67 ounces per square yard, and a thickness of about 0.5 inch. However, the thickness and density of the second layer 103 may be adjusted in accordance with the viscosity of the liquid waste desired to be removed from solid or semi-solid waste. The Fiberfill product is advantageous since it has a high tensile strength, it is relatively inexpensive, it resists shifting or clumping, and it retains little or no water (i.e. it is "hydrophobic").

In an alternate embodiment (FIG. 3), the second layer 103 may take the form of three sub layers: a polymeric fibrous mat 302 with two interwoven layers of polymeric netting 304, 306. The polymeric netting 304, 306 helps keep the fibrous mat 302 evenly distributed, and prevents the fibrous mat 302 from shifting, clumping, or otherwise moving. In an exemplary embodiment, the second layer 103 may comprise the Erosion Blanket manufactured by Tensar Corp. (Morrow, Ga.), with a thickness of about 0.001 to 1.0 inch. However, the thickness and density of the second layer 103 may be adjusted in accordance with the viscosity of the liquid waste desired to be removed from solid or semi-solid waste.

Polyethylene, polypropylene, and polyester materials are advantageous to choose for the second layer 103 since these materials are durable, flexible, rust-proof, water insoluble, lightweight, and inexpensive. However, other flexible materials may be substituted, such as metal, polymeric, wood-based, or fiberglass screening.

The third layer 104 (FIGS. 1, 3) comprises netting such as the first layer 102, with complete sub-layers of crossing, overlapping strands that form interstices therebetween. As with the first layer 102, the thickness and spacing of the third layer 104 may be adjusted for most advantageous operation. The fourth layer 105 (FIGS. 1, 3, 4) comprises a porous filter cloth made from a dense, woven or non-woven material with a weight of between about 3 to 12 ounces per square yard. The fourth layer 105 preferably comprises a non-woven geotextile produced by Carthage Mills (Cincinnati, Ohio) for erosion control. However, woven geotextiles are also useful. Polyethylene or polypropylene material is advantageous since it is durable, flexible, rust-proof, water insoluble, lightweight, and inexpensive. However, other flexible materials may be substituted. The thickness and porosity of the fourth layer 105 may be adjusted in accordance with the viscosity of the liquid waste desired to be removed from solid or semi-solid waste.

Assembly

In an illustrative implementation, the filter 100 may be utilized as a liner for a "roll-off" container (not shown), to separate solid and liquid waste held in the container. In this application, the components of the filter 100 are prepared as shown in FIGS. 1–3. More particularly, the first and second layers 102, 103 are prepared by forming rectangular sections, as shown in FIG. 3. The third layer 104 is prepared by forming the netting into a rectangular section 308 adjoined by opposing end tabs 310–311 and opposing side tabs 312–313. The first and second layers 102, 103 are preferably sized to match the rectangular section 308 of the third layer 104.

The first and second layers 102 and 103 are then aligned with the rectangular section 308 of the third layer 104. Next, the layers 102–104 are bound together by connectors (not shown). In a preferred embodiment, the layers 102–104 are bound along the edges of the first and second layers 102, 103.

Figure 4:
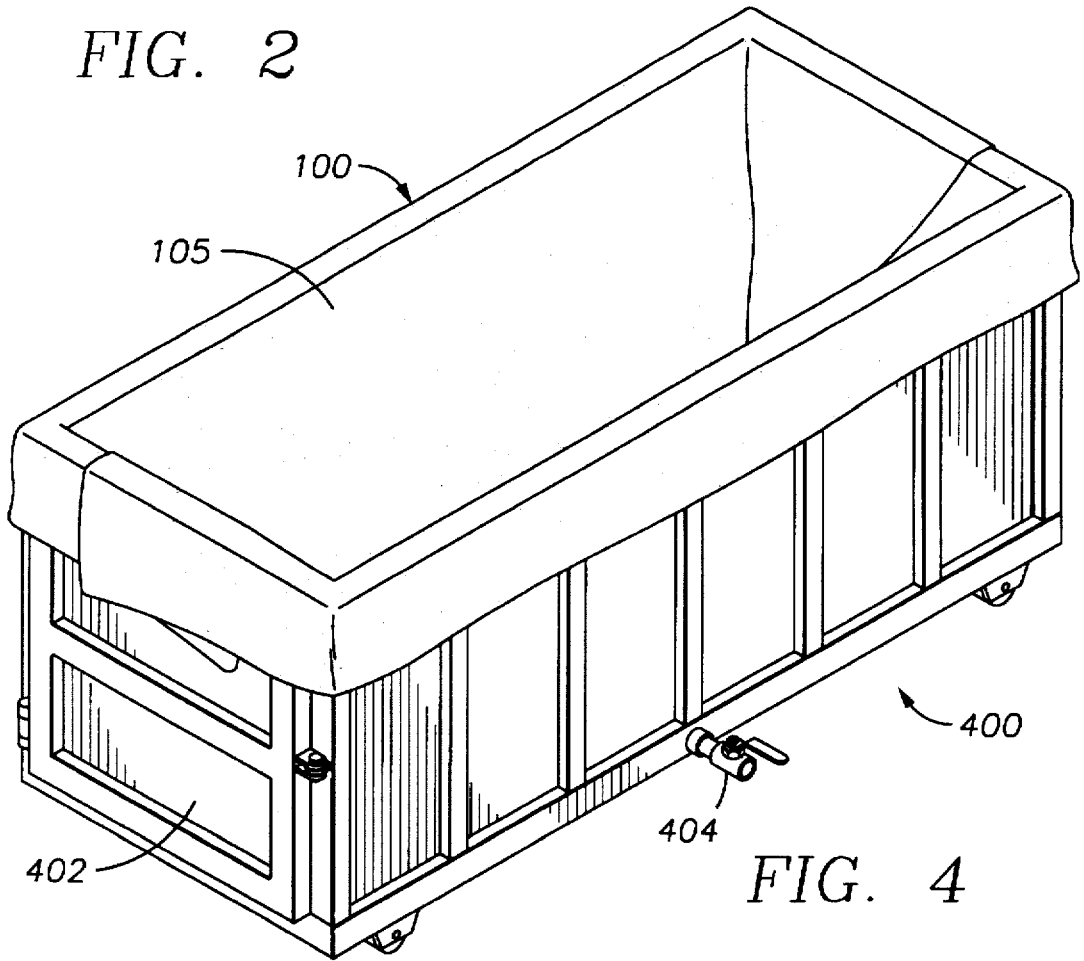
FIG. 4 is an isometric view of the filter 100 implemented in a typical roll-off container 400, in accordance with the invention.

After the layers 102–104 are assembled, the layers 102–104 may be inserted into a roll-off container 400 (FIG. 4). Preferably, the rectangular section 308 is pre-sized to fit the bottom of the roll-off container 400, so that the tabs 310–313 may be bent upwards against the sides of the roll-off container 400. The tabs 310–313 are supported by the sides of the roll-off container 400, and the first layer 102 rests upon the bottom of the roll-off container 400. After the layers 102–104 are in place in the roll-off container 400, the fourth layer 105 is positioned over the roll-off container 400 and snugly tucked into the roll-off container 400, against the other layers 102–104. The fourth layer 105 is preferably fastened to the layers 102–104 by sewing, or by using plastic or metal fasteners. The fourth layer 105 may additionally be secured around the outside lip of the roll-off container 400 by polypropylene or rubber cords, metal hooks, or other fasteners.

Use

The invention may be assembled as described above, for use as a liner to separate solid and liquid wastes placed in a roll-off container 400 (FIG. 4). Although the invention has been described with reference to roll-off containers, the filter 100 may also be utilized in conjunction with other conventional waste containers, such as dump trailers, rail gondolas, dumpsters, and the like.

Roll-off containers are typically box-shaped waste containers, commonly used for intermediate storage of waste. They are typically manufactured in sizes of 20, 25, 30, and 40 cubic yards. A typical roll-off container includes a swinging rear gate 402 to aid in emptying the roll-off container 400. In an illustrative embodiment, the gate 402 is free to swing on a vertical axis (not shown) when it is unlocked. The gate 402 may have a compressible gasket (not shown) that creates a liquid-tight seal between the gate 402 and the adjacent edges of the roll-off container 400. Roll-off containers are usually provided with skids or wheels for slidable loading onto rails mounted to the rear portion of a specially designed roll-off truck. The roll-off container is usually pulled onto the rails with a cable hoist or winch attached to the roll-off truck. The roll-off container may be unloaded from the truck by extending the forward ends of the rails with a hydraulic cylinder, thereby tilting the roll-off container and slidably removing the container from the truck. Exemplary roll-off containers include those manufactured by K-PAC (Hutchinson, Kans.), Galbreath (Winamac, Ind.), Modern Manufacturing (Beaumont, Tex.), and Accurate Industries (Alexandria, La.), to name a few.

In accordance with the invention, the roll-off container 400 may include a drain 404. For example, a 2 to 3 inch hole is drilled in the roll-off container 400, a threaded fitting is welded in the hole, and a complementarily threaded valve or spigot is screwed into the threaded fitting. The drain 404 is positioned to most efficiently discharge liquid from the roll-off container 400. In one embodiment, the drain is positioned along an edge between the bottom and a side of the roll-off container 400, to most efficiently collect liquid waste that passes through the filter 100. Alternatively, the drain may be positioned in the bottom of the roll-off container 400. The position of the drain 402 may vary depending on factors such as the container's size, shape, location, application, and the like.

After assembly of the filter 100 and installation into the roll-off container 400, a semi-solid mixture of waste is poured, dumped, or otherwise placed in the roll-off container 400. In an illustrative embodiment, the waste may be first collected by a vacuum apparatus such as a Guzzler® power vacuum system, manufactured by Guzzler Manufacturing, Inc. (Birmingham, Ala.), and then discharged into the roll-off container 400. The filter 100 may be utilized to process a wide variety of wastes, such as catalysts used in petroleum refining, industrial process sludges, sewage matter, and storm drain residue such as grit, rocks, leaves, silt, and dirt. The invention is especially advantageous when used to separate solid and liquid components of semi-solid materials such as sludges or slurries.

After the waste is placed in the roll-off container 400, the liquid waste passes through the layers 102-105, under the force of gravity. During operation of the filter 100, the tabs 310-313 are folded up against the sides of the roll-off container 400 to maintain the layers 102-103 and the rectangular section 308 squarely in place against the bottom of the roll-off container 400. The second layer 103 prevents the fourth layer 105, under pressure created by the weight of the waste above, from poking downward through the interstices in the third layer 104 and possibly blocking the downward flow of liquid therethrough. In an alternate embodiment, a third layer 104 with smaller spacing between strands and accordingly smaller interstices may be substituted. In some cases, this may avoid the need for the second layer 103, or the need for both the first and second layers 102, 103.

After the liquid waste passes through the layers 103-105, the first layer 102 channels the liquid waste along the bottom of the roll-off container 400, through the first layer 102. This is possible since, due to the overlapping nature of the strands 206, 208, the first layer 102 facilitates a substantial level of liquid channeling along its own plane. Likewise, the tabs 310-313 of the third layer 104 facilitate downward channeling of liquid along the sides of the roll-off container 400. After being channeled along the bottom of the roll-off container 400 by the first layer 102, the liquid waste may be discharged, for example, by opening the drain 404 or by partially opening the gate 402. In an illustrative embodiment, the drain 404 may be connected to a hose, to direct the liquid waste to a waste processing station such as an American Petroleum Index separator for further treatment of the liquid waste.

After removing the liquid waste, the roll-off container 400 may be loaded onto a roll-off truck and delivered to a disposal site such as a landfill. At the landfill, the roll-off container 400 is inclined by tilting the rails of the truck. Then the sealable gate 402 of the roll-off container 400 is opened to permit the solid waste and the filter 100 to slide out together into the landfill.

Testing

An illustrative embodiment of the invention was experimentally tested using a filter 100 that was constructed with the preferred components mentioned above. In the experimental test, two people installed a pre-assembled filter 100 in a 20 cubic yard roll-off container over a period of about eight minutes.

The filter 100 was then utilized to remove liquid waste present in "rubber crumb," a styrene polymer produced in the rubber manufacturing industry. Since "rubber crumb" is particularly "sticky", removal of its liquid waste component is known to be particularly awkward and difficult. The filter 100 was observed to perform remarkably, removing approximately 98% of the rubber crumb's liquid component.

Conclusion

The present invention provides its users with a number of advantages. For example, the invention may be easily and inexpensively manufactured, since the filter 100 requires very few parts, each of which is inexpensive and may be supplied by commercially available products. Moreover, due to the construction of the filter 100 and the flexibility of its components, the invention is easily installed, and may in many cases be installed by one or two people.

In addition, the invention is advantageous since it provides a convenient means for disposing of solid waste, without requiring any handling of the waste itself. In particular, the filter 100 may be utilized like a trash bag—first to hold the waste, and then to be disposed of along with the waste. This is possible since the filter 100 is relatively inexpensive, and since the filter 100 is easily removable from a variety of waste containers. Specifically, the layers 102-104 merely rest on the bottom of a waste container without being attached thereto. Accordingly, the filter 100 may be easily removed from a waste container by, for example, opening a gate in the waste container and sliding the filter through the gate along the bottom of the waste container. This avoids any potential inconvenience or delay that might be involved in disconnecting the layers 102-104 from the waste container.

Moreover, since the layers 102-105 may be manufactured from sheets of lightweight, durable polymers, the invention provides longevity. Moreover, since the filter 100 may be flattened and then bundled or "rolled up", it provides ease of packaging, shipping, and storage.

The invention is also beneficial since it may be sized to fit many different sizes and shapes of waste containers. Moreover, to be used with the filter of the invention, most conventional waste containers require little or no modification, e.g., installation of the drain 404.

While there have been shown what are presently considered to be preferred embodiments of the invention, it will be apparent to those skilled in the art that various changes and modifications can be made herein without departing from the scope of the invention as defined by the appended claims. For example, use of the invention is not limited to roll-off waste containers. The invention may be implemented in many other shapes of containers by an ordinarily skilled artisan having the benefit of this disclosure. Additionally, in certain applications, the filter 100 may be constructed without the third layer 104, or the filter 100 may be constructed without the second and third layers 103, 104 by utilizing a first layer 102 with smaller interstices. Moreover, some applications may utilize a second layer 103 that includes the fibrous mat 302 with only one layer or interwoven netting 304, 306, or without any layers of interwoven netting 304, 306.

What is claimed is:

1. A multi-layer filter for separating liquid from semi-solid material, comprising:

(a) a first layer comprising a first distinct sub-layer of flexible parallel strands and a second distinct sub-layer of flexible parallel strands, wherein the strands in the first distinct sub-layer overlie and cross the strands in the second sub-layer to facilitate channeling of liquids along the parallel strands of the first distinct sub-layer and along the parallel strands of the second distinct sub-layer;

(b) a second layer overlying the first layer, the second layer comprising a flexible fibrous mat that facilitates passage of liquid therethrough;

(c) a third layer overlying the second layer, the third layer comprising a first distinct sub-layer of flexible parallel strands and a second distinct sub-layer of flexible parallel strands wherein the strands in the first distinct sub-layer of the third layer overlie and cross the strands in the second distinct sub-layer of the third layer to facilitate channeling of liquids along the parallel strands of the first distinct sub-layer of the third layer and along the parallel strands of the second distinct sub-layer of the third layer; and (d) a fourth layer overlying the third layer, the fourth layer having interstices sized to inhibit passage of solid material therethrough and to facilitate passage of liquid therethough.

2. The filter of claim 1, wherein the first layer comprises a polymeric material.

3. The filter of claim 1, wherein the second layer comprises a material selected from the group consisting of polymers and fiberglass.

4. The filter of claim 1, wherein the third layer comprises a material selected from the group consisting of polymers and fiberglass.

5. The filter of claim 1, wherein the fourth layer comprises a material selected from the group consisting of polymers and cotton.

6. The filter of claim 1, wherein the fourth layer comprises a material selected from the group consisting of a non-woven material and a woven material.

7. The filter of claim 1, further comprising means for interconnecting the first, second, third, and fourth layers.

8. The filter of claim 1, wherein the strands in each sub-layer of the first layer are separated from each other by about 0.25 inch.

9. The filter of claim 1, wherein the strands in each sub-layer of the third layer are separated from each other by about 0.25 inch.

10. The filter of claim 1, wherein the first layer has a thickness of between about 0.2 and 0.265 inch.

11. The filter of claims 1, wherein the second layer has a thickness of about 0.5 inch.

12. The filter of claim 1, wherein the fourth layer has a weight of between about 3 and 12 ounces per square yard.

13. The filter of claim 1, wherein the first layer and the second layer are rectangular and wherein the third layer additionally comprises two opposing end tabs and two opposing side tabs.

14. The filter of claim 1, further comprising a waste container.

15. The filter of claim 14, wherein the waste container comprises a roll-off waste container.

16. The filter of claim 13, further comprising a waste container including a bottom and four sides, wherein the bottom supports the filter and the sides support the end and side tabs.

17. The filter of claim 16, wherein the waste container comprises a roll-off waste container.

18. The filter of claim 1, wherein the second layer additionally includes at least one sub-layer comprising a layer of netting interwoven with the fibrous mat.

19. The filter of claim 1, wherein said fourth layer comprises a flexible, porous filter cloth.

20. The filter of claim 1, further comprising means for coupling said first, second, third, and fourth layers together.

21. A multi-layer filter for separating liquid from semi-solid material, the multi-layer filter comprising:

a filtering layer having interstices sized to inhibit passage of solid material therethrough and to facilitate passage of liquid therethough; and a channeling layer underlying the filtering layer, wherein the channeling layer comprises a first distinct sub-layer of parallel strands and a second distinct sub-layer of parallel strands, wherein the strands in the first distinct sub-layer overlie and cross the strands in the second distinct sub-layer to facilitate channeling of liquids along the parallel strands of the first distinct sub-layer and along the parallel strands of the second distinct sub-layer.

22. The filter of claim 21, wherein the filtering layer comprises a porous filter cloth.

23. The filter of claim 21, wherein the strands in each sub-layer of the channeling layer are separated from each other by about 0.25 inch.

24. The filter of claim 21, wherein the channeling layer has a thickness of between 0.2 inch and 0.265 inch.

25. The filter of claim 21, further comprising means for coupling said filtering layer and said channeling layer together.

26. A multi-layer filter for separating liquid waste from semi-solid waste, the multi-layer filter comprising:

a filtering layer having interstices sized to inhibit passage of solid material therethrough and to facilitate passage of liquid therethrough;

a first channeling layer underlying the first filtering layer, the first channeling layer having at least one channel formed therein that direct liquid along the first channeling layer;

an isolation layer underlying the first channeling layer to impede progression of the filtering layer through the first channeling layer and to facilitate passage of liquid therethrough; and a second channeling layer underlying the isolation layer, the second channeling layer having at least one channel formed therein that direct liquid along the second channeling layer.

27. The filter of claim 26, wherein the filtering layer comprises a porous filter cloth.

28. The filter of claim 26, wherein the first channeling layer comprises a layer of strands that directs liquid along the first channeling layer.

29. The filter of claim 26, wherein the first channeling layer comprises a first sub-layer of parallel strands and a second sub-layer of parallel strands, wherein the strands in the first sub-layer overlap and cross the strands in the second sub-layer to form a netting that facilitates channeling of liquids along the parallel strands of the first sub-layer and along the parallel strands of the second sub-layer.

30. The filter of claim 29, wherein the strands in each sub-layer of the first channeling layer are separated from each other by about 0.25 inch.

31. The filter of claim 26, wherein the isolation layer comprises a fibrous mat.

32. The filter of claim 26, wherein the isolation layer comprises:

a fibrous mat having a first side and a second side;

a first layer of netting coupled to said first side of said fibrous mat; and a second layer of netting coupled to said second side of said fibrous mat.

33. The filter of claim 26, wherein the second channeling layer comprises a layer of strands that directs liquid along the second channeling layer.

34. The filter of claim 26, wherein the second channeling layer comprises a first sub-layer of parallel strands and a second sub-layer of parallel strands, wherein the strands in the first sub-layer overlap and cross the strands in the second sub-layer to form a netting that facilitates channeling of liquids along the parallel strands of the first sub-layer and along the parallel strands of the second sub-layer.

35. The filter of claim 34, wherein the strands in each sub-layer of the second channeling layer are separated from each other by about 0.25 inch.

36. The filter of claim 26, wherein the channeling layers each have a thickness of between 0.2 inch and 0.265 inch.

37. The filter of claim 26, further comprising means for coupling said filtering layer, said first channeling layer, said isolation layer, and said second channeling layer together.

38. A multi-layer filter for separating liquid waste from semi-solid waste the multi-layer filter comprising:
   a first filtering layer having a central portion and a peripheral portion, said first filtering layer having interstices sized to inhibit passage of solid material therethrough and to facilitate passage of liquid therethrough;
   a first channeling layer having a central portion underlying the central portion of the first filtering layer and having a peripheral portion underlying the peripheral portion of the first filtering layer, the first channeling layer having at least one channel formed therein that direct liquid along the first channeling layer;
   a second filtering layer having a central portion underlying the central portion of the first channeling layer, said second filtering layer having interstices sized to inhibit passage of solid material therethrough and to facilitate passage of liquid therethrough; and
   a second channeling layer having a central portion underlying the central portion of the second filtering layer, the second channeling layer having at least one channel formed therein that direct liquid along the second channeling layer.

39. The filter of claim 38, wherein the first filtering layer comprises a porous filter cloth.

40. The filter of claim 38, wherein the first channeling layer comprises a layer of strands that directs liquid along the first channeling layer.

41. The filter of claim 38, wherein the first channeling layer comprises a first sub-layer of parallel strands and a second sub-layer of parallel strands, wherein the strands in the first sub-layer overlap and cross the strands in the second sub-layer to form a netting that facilitates channeling of liquids along the parallel strands of the first sub-layer and along the parallel strands of the second sub-layer.

42. The filter of claim 41, wherein the strands in each sub-layer of the first channeling layer are separated from each other by about 0.25 inch.

43. The filter of claim 38, wherein the second filtering layer comprises a fibrous mat.

44. The filter of claim 38, wherein the second filtering layer comprises:
   a fibrous mat having a first side and a second side;
   a first layer of netting coupled to said first side of said fibrous mat; and
   a second layer of netting coupled to said second side of said fibrous mat.

45. The filter of claim 38, wherein the second channeling layer comprises a layer of strands that directs liquid along the second channeling layer.

46. The filter of claim 38, wherein the second channeling layer comprises a first sub-layer of parallel strands and a second sub-layer of parallel strands, wherein the strands in the first sub-layer overlap and cross the strands in the second sub-layer to form a netting that facilitates channeling of liquids along the parallel strands of the first sub-layer and along the parallel strands of the second sub-layer.

47. The filter of claim 46, wherein the strands in each sub-layer of the second channeling layer are separated from each other by about 0.25 inch.

48. The filter of claim 38, wherein the channeling layers each have a thickness of between 0.2 inch and 0.265 inch.

49. The filter of claim 38, further comprising means for coupling said first filtering layer, said first channeling layer, said second filtering layer, and said second channeling layer together.

50. A multi-layer filter for separating solid waste from liquid waste, the multi-layer filter consisting essentially of:
   a first layer comprising a first distinct sub-layer of flexible parallel strands and a second distinct sub-layer of flexible parallel strands, wherein the strands in the first distinct sub-layer overlie and cross the strands in the second distinct sub-layer to facilitate channeling of liquids along the parallel strands of the first sub-layer and along the parallel strands of the second sub-layer;
   a second layer overlying the first layer, the second layer comprising a flexible fibrous mat that facilitates passage of liquid therethrough;
   a third layer overlying the second layer and having a portion of the third layer extending past the first layer and the second layer, the third layer comprising a first distinct sub-layer flexible parallel strands and a second distinct sub-layer of flexible parallel strands, wherein the strands in the first distinct sub-layer of the third layer overlie and cross the strands in the second distinct sub-layer of the third layer to facilitate channeling of liquids along the parallel strands of the first distinct sub-layer of the third layer and along the parallel strands of the second distinct sub-layer of the third layer; and
   a fourth layer overlying the third layer, the fourth layer having interstices sized to inhibit passage of solid material therethrough and to facilitate passage of liquid therethough.

51. The filter of claim 50, comprising means for coupling said first, second, third, and fourth layers together.

52. The filter of claim 50, wherein said fourth layer comprises a flexible, porous filter cloth.

53. A multi-layer filter for separating liquid waste from semi-solid waste, the multi-layer filter consisting essentially of:
   a filtering layer having interstices sized to inhibit passage of solid material therethrough and to facilitate passage of liquid therethrough;
   a first channeling layer underlying the first filtering layer, the first channeling layer having at least one channel formed therein that direct liquid along the first channeling layer;
   an isolation layer underlying the first channeling layer to impede progression of the filtering layer through the first channeling layer and to facilitate passage of liquid therethrough; and
   a second channeling layer underlying the second filtering layer, the second channeling layer having at least one channel formed therein that direct liquid along the second channeling layer.

54. The filter of claim 53, comprising means for coupling said filtering layer, said first channeling layer, said isolation layer, and said second channeling layer together.

* * * * *